US005951871A

United States Patent [19]

Gannon

[11] Patent Number: 5,951,871
[45] Date of Patent: Sep. 14, 1999

[54] METHOD AND APPARATUS FOR SEPARATING LIQUID-LIQUID MIXTURES

[75] Inventor: Raymond Peter Gannon, St. Lucia, Australia

[73] Assignee: The University of Queensland, Queensland, Australia

[21] Appl. No.: 08/765,678
[22] PCT Filed: Jul. 18, 1995
[86] PCT No.: PCT/AU95/00432

§ 371 Date: Jan. 9, 1997

§ 102(e) Date: Jan. 9, 1997

[87] PCT Pub. No.: WO96/02316

PCT Pub. Date: Feb. 1, 1996

[30] Foreign Application Priority Data

Jul. 18, 1994 [AU] Australia .............................. PM 6857

[51] Int. Cl.[6] .................................................... B01D 61/00

[52] U.S. Cl. .................... 210/650; 210/331.75; 210/175; 210/653

[58] Field of Search ............................ 210/321.6, 321.75, 210/321.84, 650, 651, 652, 640, 321.71, 356, 180, 175, 653; 95/45, 50, 46, 52; 96/6

[56] References Cited

U.S. PATENT DOCUMENTS 3,405,058 10/1968 Miller ...................................... 210/640
3,827,561 8/1974 Serfass et al. ..................... 210/321.71
4,222,871 9/1980 Lefeuvre ................................ 210/640
5,062,927 11/1991 Stout ...................................... 210/640
5,078,755 1/1992 Tozaua et al. .............................. 95/45
5,537,911 7/1996 Ohlrogge et al. ........................... 95/45

FOREIGN PATENT DOCUMENTS 80242 6/1995 Australia .
0655274 5/1995 European Pat. Off. .

OTHER PUBLICATIONS

Patent Abstracts of Japan, C–218, p. 18, JP,A 57–1009742 (Asahi Kasei Kogyo K.K.), Jan. 5, 1984.

Derwent Abstract Accession No. 94–329166/41 Class E 17, JP, A, 06254354 (Mitsubishi Kasei Corp) Sep. 13, 1994.

*Primary Examiner*—Ana Fortuna
*Attorney, Agent, or Firm*—Panitch Schwarze Jacobs & Nadel, P.C.

[57] ABSTRACT

A method and apparatus for separating liquid-liquid mixtures such as temperature sensitive mixtures, the method converts the liquid mixture into a spray and sparys the mixture against one side of a membrane. This process improves separation.

15 Claims, 2 Drawing Sheets

METHOD AND APPARATUS FOR SEPARATING LIQUID-LIQUID MIXTURES

BACKGROUND OF THE INVENTION

This invention relates to a method and apparatus for separating liquid-liquid mixtures and relates particularly to separation of liquid-liquid mixtures which may be temperature sensitive, flammable, toxic, or otherwise unsuitable, for separation using heat distillation. The method and apparatus is particularly suitable for separating undesirable liquid components from bio-fluids, such as blood plasma.

A well known liquid-liquid separation technique involves distillation whereby liquids of different boiling points can be separated. For liquids having close boiling points, separation efficiency is enhanced by using distillation columns. Distillation is unsuitable for many types of liquids including temperature-sensitive liquids (i.e., bio-fluids, certain liquid food products), highly flammable liquids, such as the low molecular weight ethers, liquids which have toxic vapours, or liquid-liquid mixtures where separation must be done quickly.

Membrane separation is used where separation of liquid mixtures by distillation is undesirable. Membrane separation is more commonly used to remove liquids from a liquid/dissolved solid mixture. The methodology behind membrane separation can be very complex and can include osmotic pressure, relative vapour pressures, diffusion co-efficient, molecular size, molecular shape and molecular charge.

A known type of liquid-liquid separation using membranes involves a combined permeation/evaporation method. A liquid-liquid mixture is passed into a first chamber which is separated from a second chamber by a membrane. A pressure differential is applied across the membrane and by correct choice of the membrane, a particular component in the liquid-liquid mixture will permeate across the membrane selectively in preference to other components. This type of membrane separation is described in European patent specification 0346739 and Japanese patent specification 1-159007. While this technique allows separation of temperature-sensitive components, a disadvantage with the technique is that it is relatively slow, making it less suitable for separation of mixtures which are unstable over time, or which must be treated quickly. For instance, slow membrane separation techniques are not suitable for purification of bio-fluids which must be removed from a patient's body, purified and re-introduced into the patient's body, as quickly as possible. The slow membrane separations are also unsuitable in many pharmaceutical, medical and beverage applications where it is desirable to achieve separation as quickly as possible.

SUMMARY OF THE INVENTION

The present invention provides a method and an apparatus which can at least partially separate liquid from a liquid-liquid mixture in a manner which may overcome the abovementioned disadvantages. The method utilizes a membrane to separate liquid-liquid mixtures and is characterized by converting the initial liquid-liquid mixture into a fine spray before contacting the membrane. The combination of membrane separation with initial atomization of the liquid-liquid mixtures can produce superior results.

In one form, the invention resides in a method for separating a liquid from a liquid-liquid mixture, the method comprising the steps of contacting the liquid-liquid mixture against one side of a separating membrane in the form of a spray.

The liquid-liquid mixture may be atomised into a fine droplet spray by any suitable method or apparatus. A nozzle may be used to convert the liquid mixture into a spray of fine droplets. The spray may be generated within a gas flow and this may be achieved via a venturi type device. The gas may be an inert or reactive gas and may include compressed air, steam, nitrogen, carbon dioxide, sulphur dioxide, ethylene oxide, fluorine, hydrogen, argon, or mixtures thereof. The gas or gas mixture may be able to carry an electric charge.

The membrane may comprise a rigid or flexible membrane. A rigid perforated/porous ceramic or metal membrane may be used. An alternative form of membrane is a flexible polymer membrane. Known membranes may be used, these including semi-permeable flexible silicone rubber films which may be impregnated with zeolite materials. The zeolite materials can provide a range of pore sizes which can correspond which desired molecular sizes of liquid mixture components to be separated. The membrane may include a flexible nitrilebutadiene rubber, polyisobutylene rubber or styrenebutadiene co-polymer rubbers. The membrane may be hydrophobic. It is preferred that the membrane is an elastomeric polymer material impregnated with zeolites or other appropriate material of known absorption/permeability characteristics. It is also preferred that the membrane is able to carry an electric charge and this can be achieved either by choice of the membrane itself, choice of impregnated substances on or in the membrane, or by supporting the membrane on a support which can be charged.

To assist in the separation process, the membrane and/or the liquid-liquid mixture may be subjected to an electric charge. The liquid-liquid spray may be charged by admixture with a gas which can be charged. The charge may be positive or negative. The membrane may comprise or include conductive components to allow it to accommodate a charge. Thus, the membrane may be impregnated with micro-porous compounds such as zeolite which have been sensitized with conductive components. Altematively, or in addition to the above, the membrane may be associated with a support which may be subject to a charge.

To assist in the separation process, a pressure differential may be provided across the membrane. Suitably, the outlet side of the membrane is at a reduced pressure relative to the inlet side of the membrane.

For flexible or delicate membranes, a support may be provided. The support may comprise a mesh or grid. The support may extend adjacent the outlet side of the membrane. The support may be conductive and may be able to be charged either positively or negatively. The support may also be able to be heated.

In another form, the invention resides in an apparatus for at least partially separating a liquid-liquid mixture, the apparatus comprising a liquid from a first inlet chamber and a second outlet chamber, a membrane separating the inlet and outlet chambers, and means to convert the liquid-liquid mixture into a spray before contact with the membrane.

The inlet and outlet chambers may be subject to pressure variation and it is preferred that the outlet chamber is of reduced pressure relative to the inlet chamber.

The means to convert the liquid-liquid mixture into a spray may comprise a nozzle. A gas flow may be used to assist in converting a liquid-liquid mixture into a spray and this may be as described above.

The membrane and support may also be as described above.

Suitably, the inlet chamber includes means to return liquid in the inlet chamber to a liquid reservoir or to the means to convert the liquid into a spray. The outlet chamber may be provided with a drain.

BRIEF DESCRIPTION OF THE SEVERAL VIEWS OF THE DRAWINGS

An embodiment of the invention will be described with reference to the following figures in which.

DETAILED DESCRIPTION OF THE INVENTION

Figure 1:
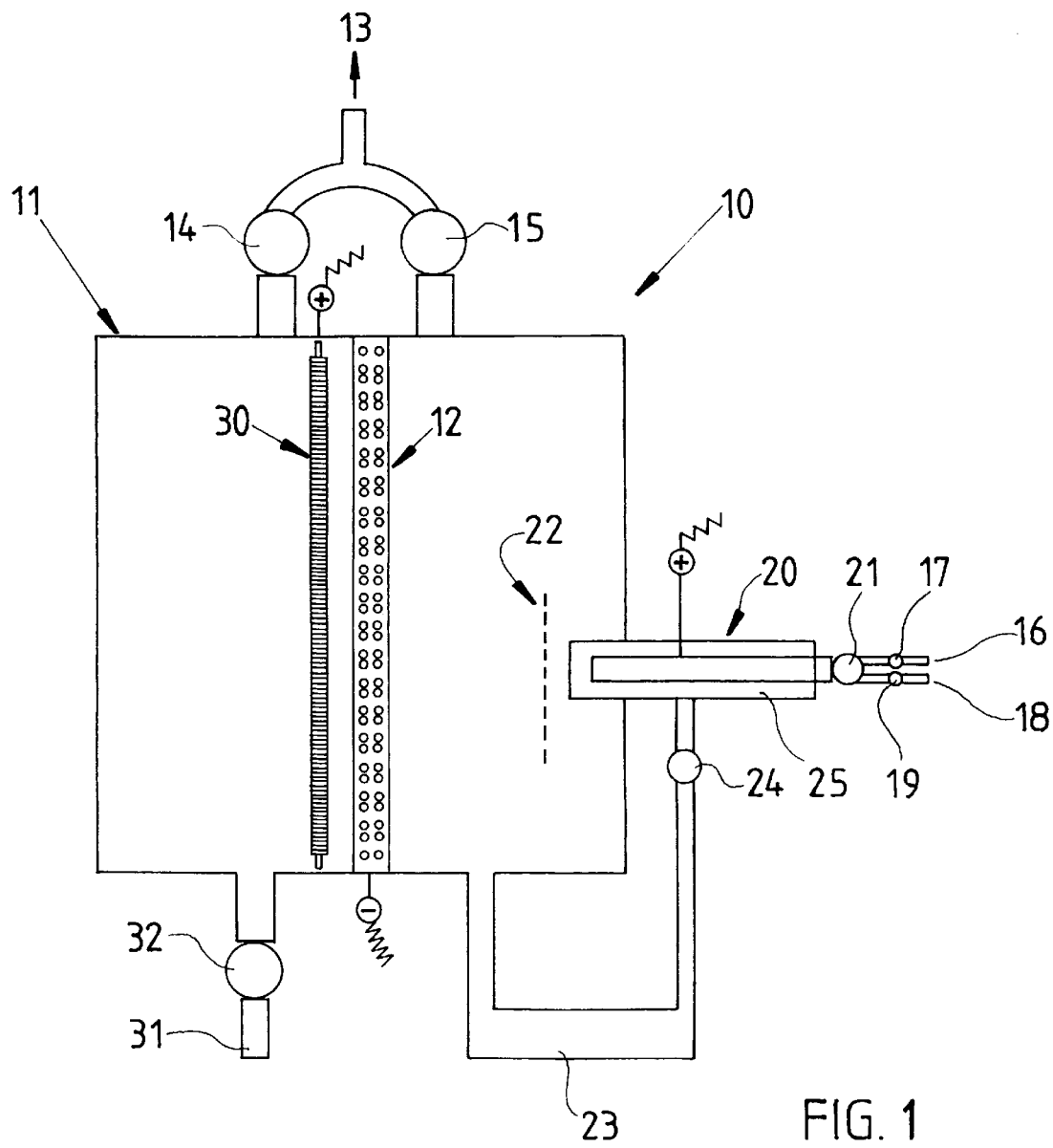
FIG. 1 illustrates a separating apparatus utilising a planar membrane.
Figure 2:
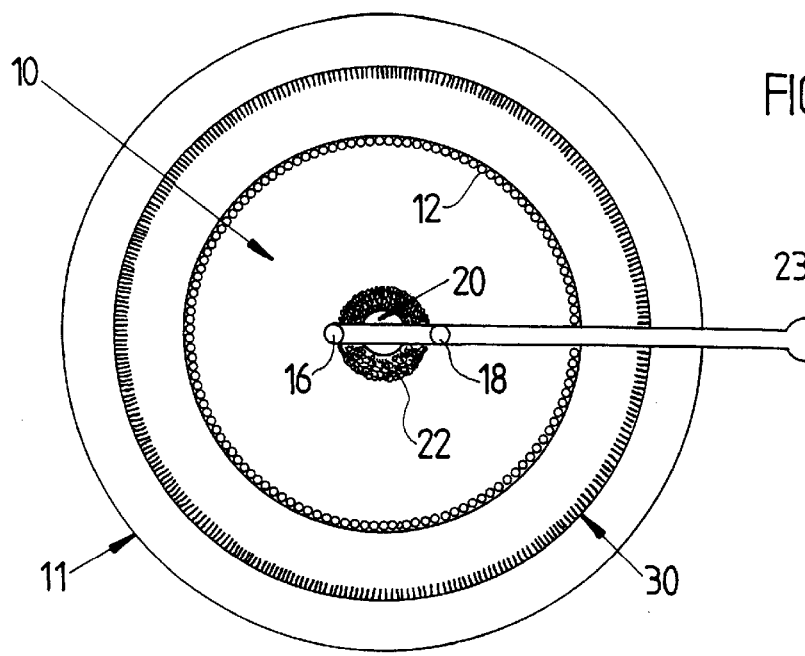
FIG. 2 illustrates a separating apparatus using a cylindrical membrane.
Figure 3:
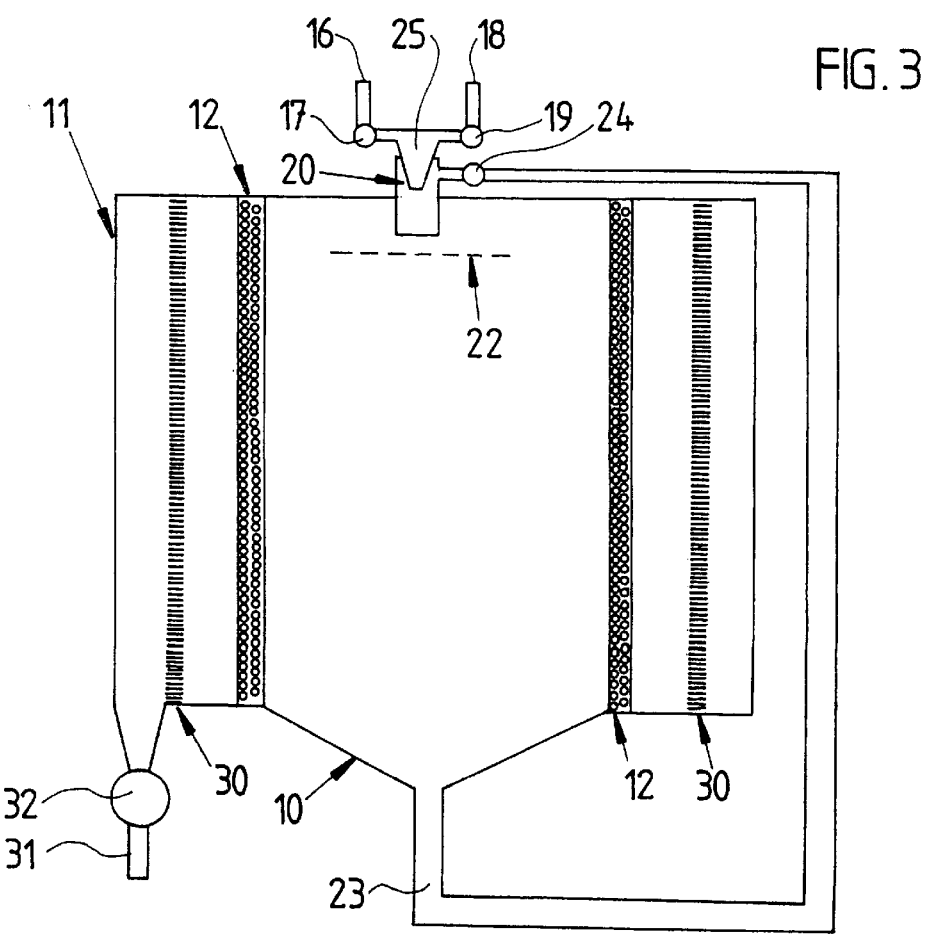
FIG. 3 is a side view of the apparatus of FIG. 2.

Referring to FIGS. 1, 2 and 3 there are illustrated two versions of an apparatus to at least partially separate a liquid from a liquid-liquid mixture, the apparatus of FIG. 1 having a planar membrane, and the apparatus of FIG. 2 being substantially cylindrical with a cylindrical membrane. Like numbers have been used to illustrate like parts.

The apparatus comprises a first inlet chamber 10 and a second outlet chamber 11. Chambers 10 and 11 are separated by a flexible semi-permeable membrane 12. Chambers 10 and 11 can be evacuated by connection of the chambers to a vacuum source 13 (not shown). Valves 14, 15 are used to regulate the vacuum within chambers 10 and 11. The chambers are designed to operate under pressures of about 25 mbar.

A liquid-liquid mixture which is to be separated passes through inlet 16, the flow rate being regulated by valve 17. The liquid-liquid mixture is mixed with a gas passing through conduit 18 which is again controlled by a valve 19. The liquid and gas mixtures are passed into an atomising nozzle 20, the rate of which can be determined by valve 21. Nozzle 20 atomises the liquid gas mixture and sprays it into chamber 10. In front of nozzle 20 and in chamber 10 is located a conductive micro-mesh screen 22. Screen 22 functions to assist in droplet dispersion and assists electric charge/vapour transfer. As nozzle 20 introduces the spray into chamber 10, chamber 10 becomes pressurised relative to chamber 11 which results in a pressure differential being formed across membrane 12. Any spray which condenses into larger droplets or a liquid can be recycled through conduit 23 back to nozzle 20, the rate of recycle being determined by valve 24. The forward part of nozzle 20 is within a vacuum sleeve 25 to allow recycled liquid to pass through conduit 23 and re-emerge into chamber 10 as a spray.

A support 30 in the form of a conductive mesh or grid is positioned in outlet chamber 11 and slightly spaced from flexible membrane 12. When chamber 10 becomes positively pressurized relative to chamber 11 due to spray being introduced into chamber 10, membrane 12 is pushed against support 30. Support 30 can be electrically charged as can membrane 12. Nozzle 20 can also be electrically charged and in the embodiment, nozzle 20 is negatively charged while membrane 12 is positively charged. The effect of the charge is to facilitate passage of spray droplets towards membrane 12. Membrane 12 functions to separate the liquid-liquid mixture and the component which preferentially passes through membrane 12 can be collected in chamber 11 and passed through conduit 31 which is controlled by valve 32.

In use, atomised inward liquid enters the inlet compartment which is pressurized to approximately 25 mbar. The reduced pressure in compartment 10 further encourages or promotes reduction of droplet size. The outlet compartment 11 is also initially pressurized to approximately 25 mbar. As liquid sprays into compartment 10, compartment 10 becomes positively pressurized which causes flexible membrane 12 to deform towards support 30. The charged membrane will attract the desired size of molecule to itself. The selective permeability of the impregnated compounds and the reduced atmospheric pressure on the outlet side of the membrane will cause the desired molecules to pass through the membrane. Support 30 can be electrically charged to further attract molecules out of the membrane. Support 30 may also be heated to assist the release through vaporisation of molecules passing through the membrane, and the operating temperature of support 30 can be in the range of 10–400° C. Liquid passing through the membrane can be collected in reservoirs via pressure-controlled non-return valves, or condensed in cold traps, if desired. Partially separated liquids in the inlet compartment can be recycled to the feed liquid flow via a venturi pick-up until the desired level of separation has been reached.

Membrane 12 may also be energised electrically to generate heat within its structure, thus encouraging transport of heated molecules through the membrane into the lower pressure outlet compartment.

It should be appreciated that various other changes and modifications may be made to the embodiment described without departing from the spirit and scope of the invention.

I claim:

1. A method of separating a liquid from a liquid-liquid mixture comprising the step of contacting the liquid-liquid mixture against one side of a separating membrane in the form of a spray such that said liquid may pass through said membrane so as to be separated from said mixture.

2. The method of claim 1 wherein the spray is in the form of an atomised spray or fire droplet spray.

3. The method of claim 2 wherein the separating membrane is a semi-permeable membrane.

4. The method of claim 3 wherein the membrane is selected from the group consisting of a rigid membrane, a flexible membrane, a rigid perforated ceramic membrane, a rigid perforated metal membrane, a flexible polymer membrane, a semi-permeable silicone rubber membrane, membranes impregnated with zeolite materials, a flexible nitrilebutadiene rubber membrane, a polyisobutylene rubber membrane, a styrenebutadiene rubber membrane.

5. The method of claim 3 wherein the membrane is electrically charged.

6. The method of claim 2 wherein the liquid-liquid mixture passes through a nozzle to convert it into a spray.

7. The method of claim 6 wherein the mixture is mixed with a gas flow prior to passing through the nozzle.

8. The method of claim 7 wherein the gas carries an electric charge.

9. The method of claim 1 wherein a pressure differential is provided across the membrane with the higher pressure side being the side which contacts the spray.

10. The method of claim 9 wherein a support for the membrane is provided, the support comprising a mesh extending adjacent the outlet side of the membrane.

11. The method of claim 10 wherein the support is electrically charged.

12. The method of claim 10 wherein the support is heated.

13. A liquid separation apparatus for at least partially separating a liquid from a liquid-liquid mixture, the apparatus comprising a first, inlet chamber and a second, outlet chamber, a membrane through which said liquid passes so as to separate said liquid from said liquid-liquid mixture, said membrane separating the inlet and outlet chambers, and atomizing means for converting the liquid-liquid mixture in the inlet chamber into a spray before contacting the membrane.

14. The apparatus of claim 13 wherein the first inlet chamber, in use, is of higher pressure than the second outlet chamber.

15. The apparatus of claim 14 wherein a nozzle converts the liquid-liquid mixture into the spray.

* * * * *